UNITED STATES PATENT OFFICE.

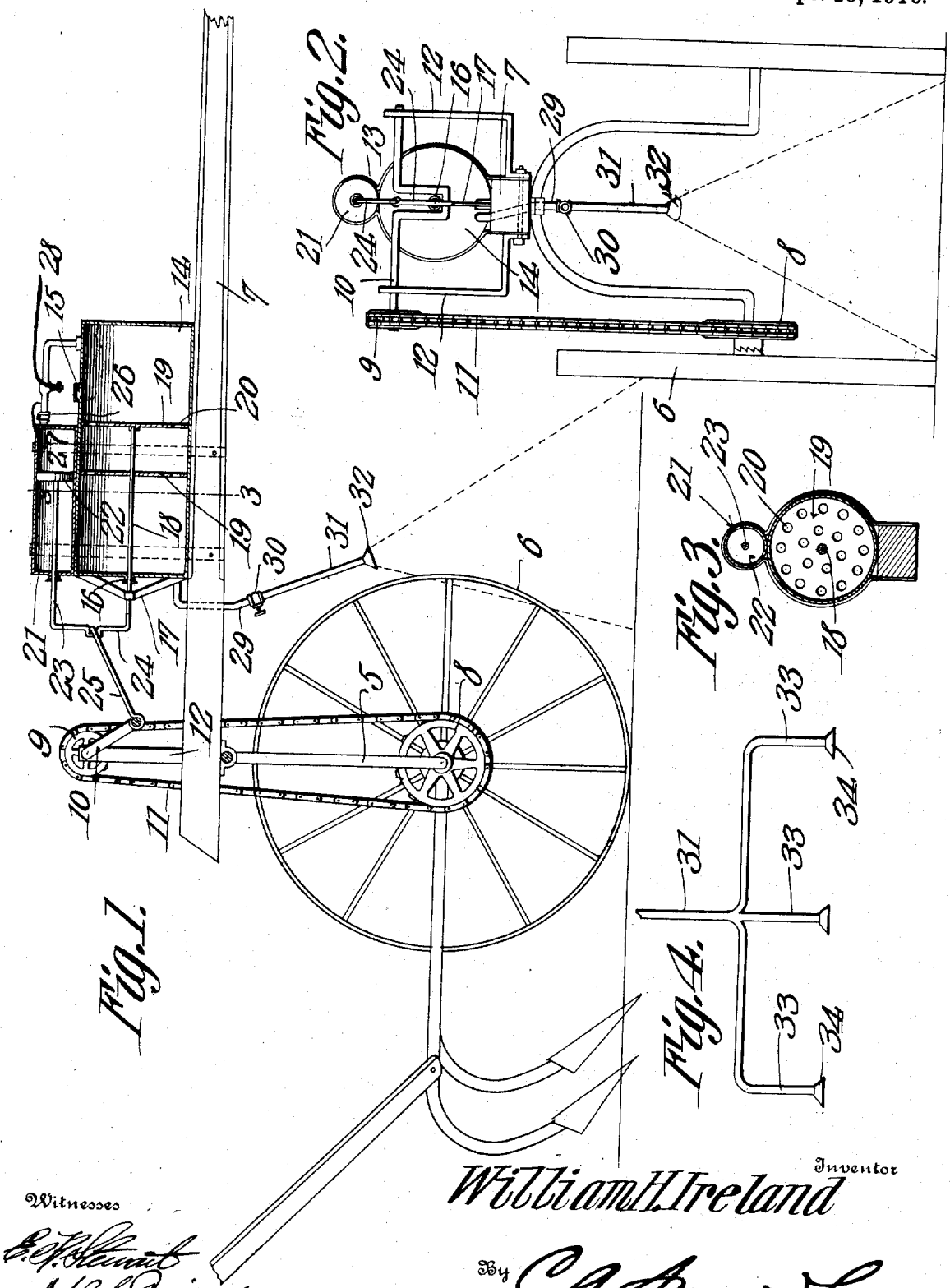

WILLIAM H. IRELAND, OF VERNDALE, MINNESOTA.

SPRAYER.

955,405.  Specification of Letters Patent.  Patented Apr. 19, 1910.

Application filed February 9, 1909. Serial No. 476,870.

*To all whom it may concern:*

Be it known that I, WILLIAM H. IRELAND, a citizen of the United States, residing at Verndale, in the county of Wadena and State of Minnesota, have invented a new and useful Sprayer, of which the following is a specification.

It is the object of the present invention to provide a spraying mechanism which is to be supported upon the tongue or other convenient part of a cultivator and which will operate to spray, with insecticide, the plants being cultivated and one object of the invention is to so construct the device that the volume of liquid discharged will be constant.

It is a further object of the invention to keep the liquid being sprayed, in a constant state of agitation so that the liquid discharged from the sprayer will be of a constant and unvarying strength.

A still further object of the invention is to provide a means for permitting the escape of air from the container of the device as soon as the air pressure within the container has reached a predetermined degree, and in making this means adjustable so that by its adjustment, the spray may be discharged with greater or less force.

In the accompanying drawings, Figure 1 is a side elevation of the fore part of a cultivator of the ordinary type showing the sprayer device embodying the invention mounted thereon. Fig. 2 is a rear elevation of the said portion of the cultivator and the sprayer device. Fig. 3 is a vertical transverse sectional view through the sprayer and pump of the sprayer on the line 3—3 of Fig. 1, and Fig. 4 is a view showing a slightly modified form of sprayer discharge.

In the drawings, the axle of the cultivator is indicated by the numeral 5, the ground wheels by the numeral 6, and the tongue by the numeral 7. A sprocket gear 8 is either clutched or permanently connected with one of the ground wheels 6 so as to rotate therewith and trained about this gear and a sprocket gear 9 at one end of the shaft 10, is a sprocket chain 11. The shaft 10 is in the nature of a crank shaft and is journaled in bearing openings in the upper ends of upwardly directed bracket arms 12 which are secured to and supported by the tongue 7, the crank portion of the shaft being located between the bracket arms as is clearly shown in Fig. 2 of the drawings. The function of this shaft will presently be made clear.

Securely held in place upon the tongue 7 of the cultivator by means of suitable straps 13, is a container which is preferably in the nature of a cylindrical tank 14 closed at both ends and provided in its upper side with a filling opening 15, the liquid to be sprayed by the device being introduced into the tank through this opening. A stuffing box 16 is provided upon the rear end of the tank 14 and the opening in this stuffing box alines with an opening in a bracket 17 also secured upon the said end of the tank, and mounted to reciprocate through the openings in the stuffing box and bracket, is a piston rod 18 carrying two perforated heads 19, the perforations in the heads being indicated by the numeral 20. These heads are preferably of sheet metal or thin plates of cast metal and it will be understood that upon reciprocation of the piston rod 18 and its heads 19, the fluid within the tank will be thoroughly agitated and as a result, all portions thereof, will be of the same strength, or in other words will contain approximately the same percentage of paris green or other insecticide employed.

The straps 13 in addition to supporting the tank 14 upon the tongue 7, serve to support a pump cylinder 21 upon the upper side of the tank 14 and working in this pump cylinder is a piston 22 the rod of which is indicated by the numeral 23, the rear ends of the piston rods 18 and 23 being connected as at 24 so that they will reciprocate in unison. In order that such reciprocation of the rods 18 and 23 may be had during the travel of the cultivator, a connecting rod 25 is connected at one end to the connection 24 between the two rods 18 and 23 and at its rear end to the crank portion of the shaft 10 so that upon rotation of this shaft, reciprocatory motion will be imparted to the two piston rods 18 and 23.

A check valve 26 is provided at one end of the pump cylinder 21 and leading from the forward end of the pump cylinder and communicating with the forward end of the tank 14 is an air conducting pipe 27 which serves to convey the air under pressure from the pump 21 to the said tank. A valve 28 is interposed in the pipe 27 at some convenient point and this valve may be adjusted so that upon a certain predetermined pressure being reached within the tank 14, the valve will open to permit escape of the air until the desired degree of pressure is secured. As will be shortly described, the spraying pipes or nozzles lead from the tank 14 and it will be understood, in connection with the valve 28, that if the said valve is adjusted so as not to open until a comparatively high degree of pressure is reached within the tank 14, the spray discharged from the nozzle will be quite strong and forcible but that on the other hand, if the valve is adjusted so that upon a comparatively low degree of pressure being reached in the tank 14, it will open, a comparatively weak stream or spray will be discharged from the tank.

The discharge mentioned above is conducted through a pipe 29 which leads from the rear end of the tank 14, downwardly, and terminates in a valved coupling 30. Detachably connected to the pipe 29 through the instrumentality of this coupling 30, is a pipe 31 having a spray nozzle or discharge 32 which has its perforated area presented downwardly. The valve in the coupling 30 is of the cut-off type so that the supply of fluid may be cut off when desired.

In the form of the invention shown in Fig. 4 of the drawings, the pipe 31 has several branches 33 each having a spray nozzle 34 and the discharge shown in this form of the invention is of course adapted for use in spraying several rows of plants at a time.

What is claimed is:—

In a sprayer, a container, a rod mounted to reciprocate in said container, perforated agitator heads carried by the rod, a pump cylinder, a pipe leading from the cylinder to the container, a safety valve interposed in said pipe, a piston working in said cylinder, a rigid connection between the rod and the piston, a crank shaft, and a connecting rod pivoted to the crank shaft and to the rigid connection between the piston and rod.

In testimony that I claim the foregoing as my own, I have hereto affixed my signature in the presence of two witnesses.

WILLIAM H. IRELAND.

Witnesses:
T. D. FRAZIER,
CARTER STEDMAN.